United States Patent [19]

Kimura et al.

[11] Patent Number: 5,040,421
[45] Date of Patent: Aug. 20, 1991

[54] MEASURING METHOD OF FLUCTUATIONS OF GROUND AND ITS APPARATUS

[75] Inventors: Koichi Kimura; Kazuma Miyamoto; Kenichiro Mihara, all of Hyogo, Japan

[73] Assignees: Kidoh Construction Co., Ltd.; Kidoh Technical Ins. Co., Ltd., both of Hyogo, Japan

[21] Appl. No.: 608,935

[22] Filed: Nov. 5, 1990

[30] Foreign Application Priority Data

Nov. 10, 1989 [JP] Japan .................................. 1-293039

[51] Int. Cl.⁵ .............................................. G01B 7/16
[52] U.S. Cl. .................................................. 73/784
[58] Field of Search .................... 73/784, 84; 33/1 HH

[56] References Cited

FOREIGN PATENT DOCUMENTS 59-195122 11/1984 Japan .
63-193304 12/1988 Japan .
422840 9/1974 U.S.S.R. ................................. 73/784
1079748 3/1984 U.S.S.R. ................................. 73/784

Primary Examiner—Jerry W. Myracle
Attorney, Agent, or Firm—Armstrong, Nikaido, Marmelstein, Kubovcik & Murray

[57] ABSTRACT

A protective tube is vertically buried in the ground, and sinking elements for generating magnetism are buried at plural positions at different depths in the ground outside the side wall of this tube. Magnetic sensors capable of detecting magnetism are disposed in the tube to detect the magnetism generated by the sinking elements, and the depth position of the sinking elements in the ground is measured according to the detected signal, so that the fluctuations by settlement or uplift of the ground may be known by each bed differing in depth. A plurality of magnetic sensors are fixed to the side wall surface of the tube, corresponding to the individual sinking elements.

10 Claims, 4 Drawing Sheets

MEASURING METHOD OF FLUCTUATIONS OF GROUND AND ITS APPARATUS

BACKGROUND OF THE INVENTION

1. Field of the Invention

The present invention relates to a method for measuring displacement of settlement and uplift of the bed inside the ground promptly by making use of current magnetic effect and an apparatus thereof.

2. Prior Art

Due to compaction by landfilling sand in ocean reclaiming works, ground excavation in underground work and drainage of underground water, the bed in the ground is subjected to settlement or uplift, which is gradually propagated to the ground surface to lead to bad influences on the structures above the ground or collapse accidents of roads etc. Accordingly, instead of controlling the settlement and uplift of the ground bed above the ground surface, recently, various methods and systems are developed to detect early occurrence of settlement or uplift in the bed inside the ground to prevent bad effects on the ground surface. The methods and apparatuses for measuring the fluctuations of the ground by depth and layer quantitatively and precisely have been disclosed, for example, in the Japanese Laid-open Patent Sho. 59-195122 and the Japanese Laid-open Utility Model Sho. 63-193304.

FIG. 5 shows an example of measuring the fluctuations by depth and layer of the prior art. A vertical hole is drilled from the ground surface into the ground 26, and a protective tube 25 is inserted and placed to protect the hole wall. At an arbitrary depth of the protective tube 25, a sinking element 3 which is a magnetic generating element is buried into the ground by striking the tube side wall by using a driving device. Each sinking element 3 driven in the ground moves up and down along with the variation of the bed of the position. To measure the depth of the sinking element 3, a detecting probe 23 having a magnetic detecting means such as magnetic sensor is lowered into the protective tube 25 by using a cable 22. When the detecting probe 23 comes to the location of the sinking element 3, a voltage is generated in the magneto-electrical converting element and this voltage is transmitted to the measuring instrument 24 above the ground by way of the cable 22. By measuring the let-off length of the cable 22 when this voltage is generated, the depth of the detecting probe 23, that is, the sinking element 3, from the ground surface can be measured. By measuring periodically the depth of the sinking element in this way, the fluctuations of the burying position of the sinking element, that is, the variation of the bed can be measured.

Problem that the Invention is to Solve

Thus, in the prior art, the positions of the sinking elements preliminarily buried in the bed were individually detected by the detecting probe which move vertically in the protective tube, and their positions were indirectly measured to detect the depth, and therefore errors are likely to be contained in the measuring results, and it is necessary to deliver the measuring instruments to the site, install and measure on every occasion, and the delivery and installation of instruments, measurement, removal and storing are frequently required and it takes much time in measurement and the operation itself is a considerable burden for the field supervisor. Especially in the underground drilling, shield and propulsion works, the jobs are often conducted continuously day and night, and the measurement operations also are needed day and night along with the progress of the work, or even every two to six hours day and night on consecutive days, and in such cases, the supervisor must do the frequent measuring jobs, aside from the main duties of excavation, shielding and propulsion, and this measuring work is a great burden.

SUMMARY OF THE INVENTION

Object of the Invention

In the light of such background, it is a first object of the invention to eliminate the necessity of moving up and down the detecting probe by using cable, and it is a second object to detect movement of plural sinking elements always and simultaneously, and it is a third object to apply in continuous recording use and alarm use which could not be realized conventionally.

Means of Solving the Problem

To achieve the above objects, in the invention, corresponding to each one of the sinking elements buried at plural positions differing in depth in the ground, magnetic sensors are fixed to the inner side wall of the protective tube.

As the sinking elements which are magnetic generating elements, usually permanent magnets in columnar shape are used, and as the device for burying the sinking elements into the ground, a striking cylinder preliminarily equipped with a sinking element is affixed to the inner wall of the protective tube in the depth for installing the sinking element, and the protective tube is inserted and placed in the measuring hole. When installation is over, compressed air, oil and the like is supplied from the ground surface to the striking cylinder to drive the sinking element into the ground. The magnetic sensors for detecting the sinking element position are placed near the setting position of the sinking element, for example, in the inner wall of the protective tube at the vertical depth position, as being preliminarily affixed on the ground. Thus, the sinking element moves along with the fluctuation of the bed, and by detecting the potential difference by the relative positions of the upper and lower sensors across the sinking element, the behavior of each sinking element can be detected.

Operation

By fixing and installing a plurality of magnetic sensors as magnetic detecting means in the inner wall of the protective tube, the positions of the sinking elements can be detected from the ground surface by the potential difference due to the relative position with the sinking element, so that the behavior of the bed in which the sinking element is buried may be always monitored without having to measure by inserting the detector as the magnetic detecting means into the protective tube by using cable. The magnetic sensor to be fixed in the protective tube can accurately detect the settlement and uplift of the bed by fixing for the portion of the assumed settlement or uplift at equal intervals symmetrically in the vertical direction, for example, around the sinking element, depending on the assumed settlement and uplift amount.

Thus, at the depth positions above and below the sinking element as the magnetic generating element driven and buried in a specified depth position from inside the protective tube, by affixing and installing a plurality of magnetic sensors on the inner wall of the protective tube, the electric quantity corresponding to the relative displacement amount between the sinking element and the magnetic sensor is picked up as a signal from each sinking element, so that the shifts of the sinking elements may be always and simultaneously known above the ground.

Effect of the Invention

By the method and apparatus for measuring the fluctuations of the ground of the invention, the following effects are obtained.

(1) Above the ground, the position of each sinking element may be measured sequentially and easily, and the measuring time can be shortened, and the fluctuation situation in the ground may be known in a short time, and hence preventive measures on the above-ground structures and important underground structures may be put into effect promptly.

(2) The method and apparatus for measurement are very simple, and it is easy to carry the measuring instruments, to measure and to store and control them, and it is also economical.

(3) Since the movement of the sinking element can be directly measured, there is no error in the indirect mechanical parts, and measurement of high precision is realized.

(4) By adding the lamp mechanism or alarm mechanism, the fluctuations of bed can be detected and controlled always by anyone, and any specialist is not needed.

DESCRIPTION OF THE PREFERRED EMBODIMENT

Figure 1:
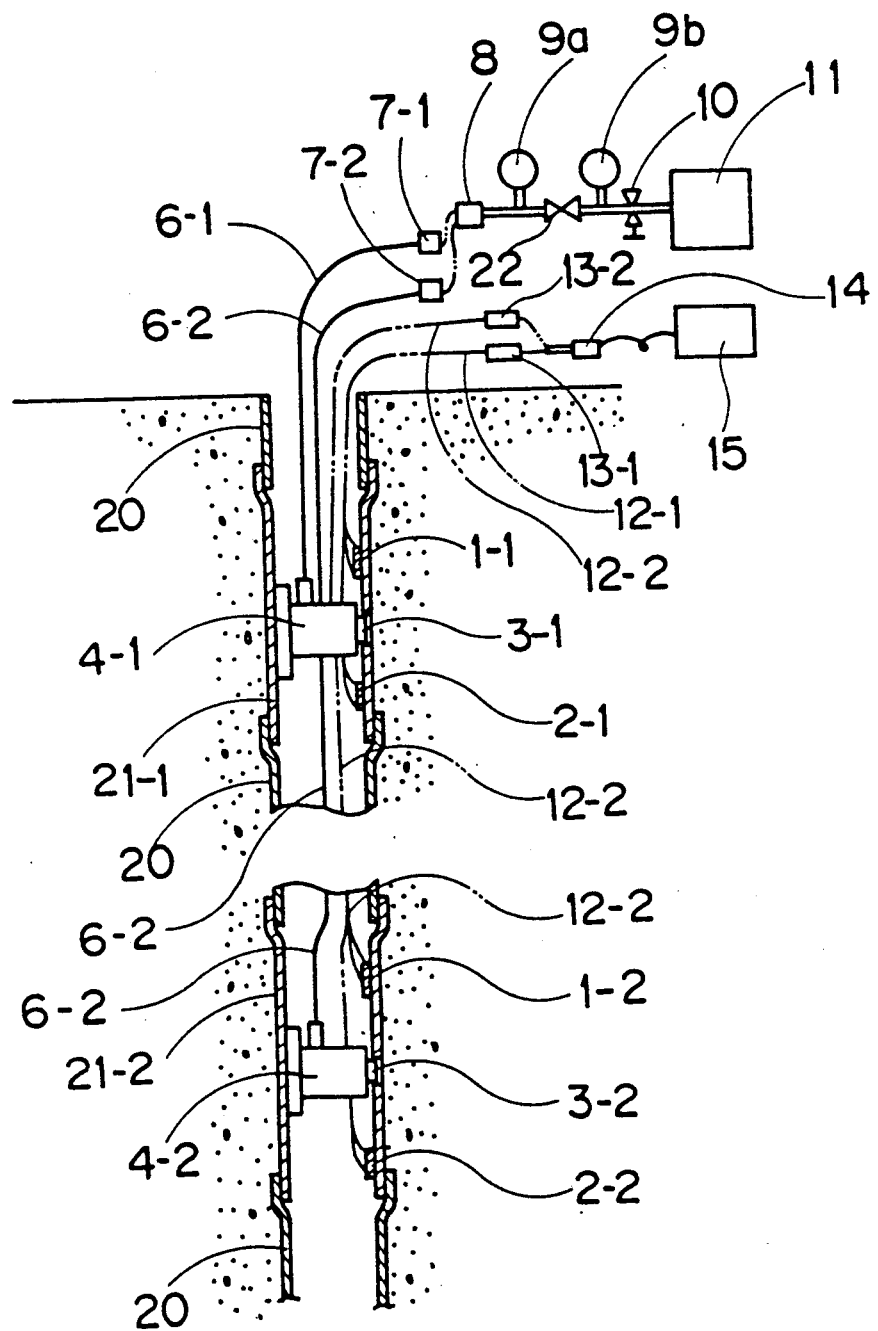
FIG. 1 is an entire sectional view showing an embodiment of the invention.

Referring now to the drawings, an embodiment of the invention is described in detail below.

FIG. 1 is an overall view of the ground fluctuation measuring apparatus of the invention. Above the ground, after alternately connecting the long tubes 20 . . . and the tube joints 21 . . . , they are inserted into the drilled holes and buried in the ground. At this time, the tube joint 21 is connected to the tube 20 by adjusting the length of the long tube 20 so that its mounting position may be the press-fitting position of the sinking element 3 which is a magnetic generating element. The protective tube buried in the ground in this way consists of first tube members (tube joints) 21-1, 21-2, . . . disposed at each burying position of plural sinking elements 3-1, 3-2, . . . , and second tube members 20 . . . disposed between the first tube members located above and beneath and also disposed at the end of the protective tube as required. The lowest end of the protective tube being installed is fixed in the firm support ground so that the protective tube may not settle.

Figure 2:
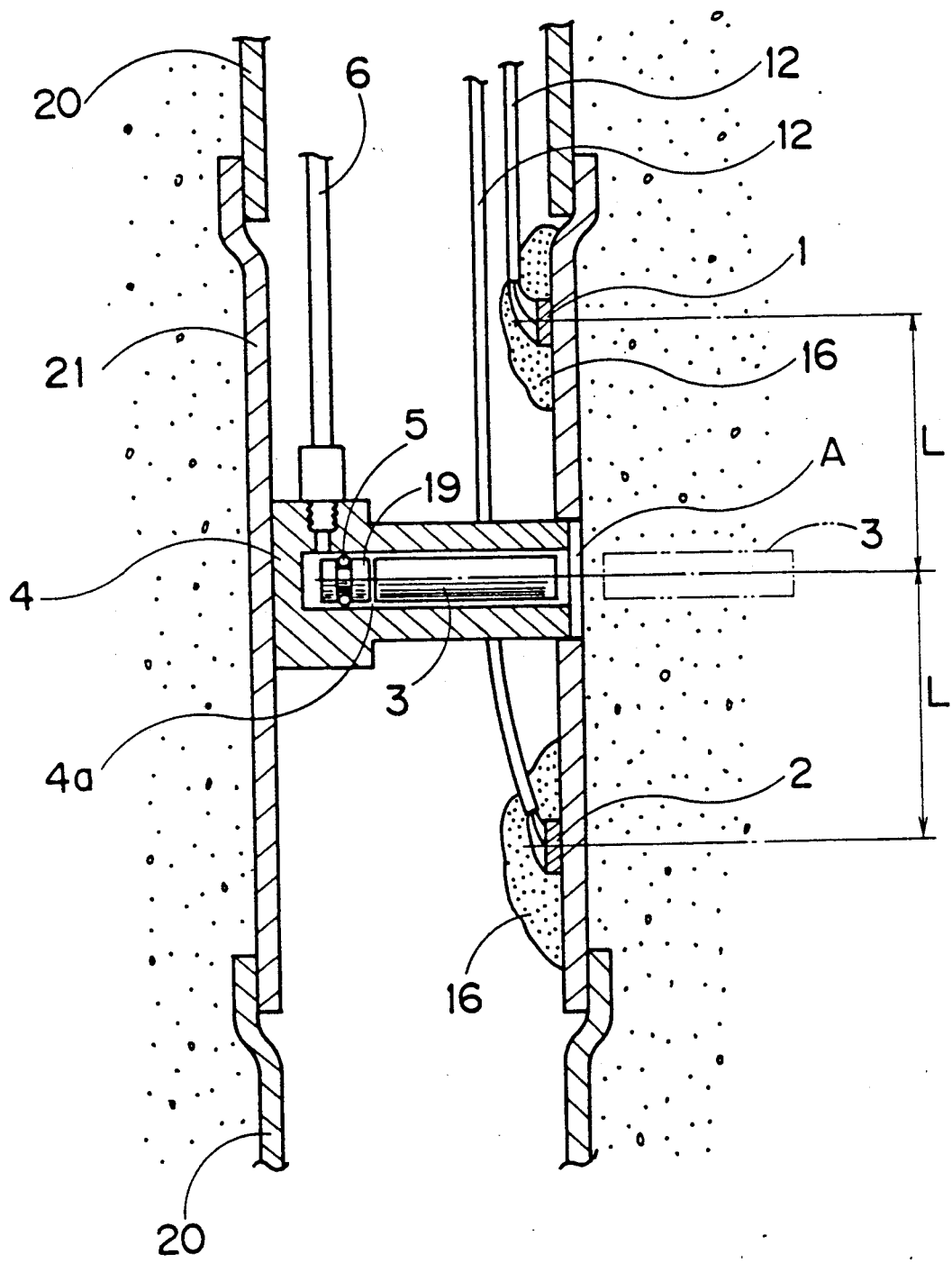
FIG. 2 is a partially magnified detailed drawing showing the installed state of a magnetic sensor on protective tube joint part in FIG. 1.

To the tube joint 21, as shown in FIG. 2, the rear end of the cylinder is affixed and fitted on the inner wall surface of the tube joint 21, nearly in the middle of the longitudinal direction of the tube joint 21. Inside the cylinder 4, a spacer 19 to be used as piston, and a driving hole 4a for loading with the sinking element 3 are provided, and an O-ring is fitted to the outside of the spacer 19 to keep airtight with the driving hole 4a. Furthermore, at the rear end of the cylinder 4, a piping material 6 for feeding compressed air to the driving hole 4a is connected. At the side wall of the tube joint 21 in the driving direction of the sinking element 3, as shown in FIG. 2, an opening A is provided at the driving position of the sinking element 3. When the side wall is soft, the sinking element 3 can break through the wall, so that it is not necessary to provide the opening A previously.

At a position of a distance of L from the center of the sinking element 3 on the peripheral wall of the tube joint 21, above and beneath, magnetic sensors 1, 2 are affixed. The magnetic sensors 1, 2 are protected with resin 16, together with the lead wire terminal.

When placing of the continuous tube (the protective tube) consisting of tube 20 . . . and tube joint 21 . . . is over, driving of the sinking element 3 into the bed is started. The driving state of the sinking element 3 is explained by referring to FIG. 1. In the first place, a coupling 7-1 at the front end of the piping member 6-1 of the upper cylinder 4-1 and a coupling 8 at the air supply source 11 side are connected. By starting up the air supply source 11, compressed air is generated, and the air pressure is regulated by a reducing valve 10, and the compressed air is supplied to the rear end of the driving hole of the cylinder 4-1 by way of the piping material 6-1. The compressed air pressure is watched by the pressure gauges 9a, 9b disposed at the air supply source 11 side. By the compressed air supplied to the driving hole 4a in the cylinder 4-1, the rear end surface of the spacer 19 is pressed, and the sinking element 3-1 and spacer 19 are pushed forward. The spacer 19 behind the sinking element 3-1 moves forward until the O-ring 5 is projected out of the driving hole 4a in the cylinder 4-1 by the function of the compressed air, and the sinking element 3-1 placed at the front part of the spacer 19 is securely press-fitted in the bed. At this time, the compressed air is released into the ground, and the air pressure drops suddenly. Accordingly, the pressure of the pressure gauge 9a at the front of the orifice 22 is significantly lowered as compared with the pressure of the pressure gauge 9b due to pressure drop, and therefore completion of driving of the sinking element 3 can be confirmed above the ground. When the driving of the upper sinking element 3-1 is over, the coupling 7-1 at the front end of the piping material 6-1 of the upper cylinder 4-1 is detached, and the coupling 7-2 at the front end of the piping material 6-2 of the lower cylinder 4-2 is connected to the coupling 8 of the air supply source 11 side, and thereafter the sinking element 3-2 is buried in the bed in the same method as mentioned above. The other sinking elements than 3-1, 3-2 are also buried in the same manner.

As the magnetic sensors 1, 2 for detecting the displacement of the sinking element 3, in this embodiment, an electro-magnetic conversion element (hereinafter magnetic sensor) is used in the following explanation. The signal from the magnetic sensors 1-1, 2-1 reach up to a connector 13-1 by way of a cable 12-1, and by connecting the connector 13-1 to the connector 14 of the checker 15, the relative positions of the magnetic sensors 1-1, 2-1 at the positions of the above measuring points and the sinking element 3-1, that is, the displacement of the bed is displayed in the checker 15. Likewise, by changing the connections of the connectors 13-2, ... at the other measuring positions, the displacement of the bed at other measuring positions can be displayed.

Figure 3:
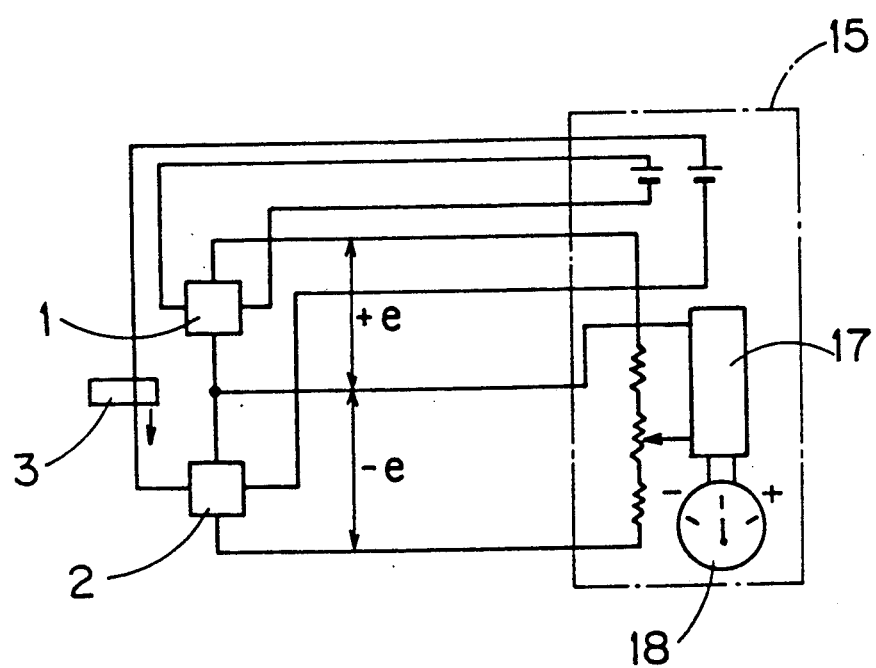
FIG. 3 is a measuring circuit diagram.
Figure 4:
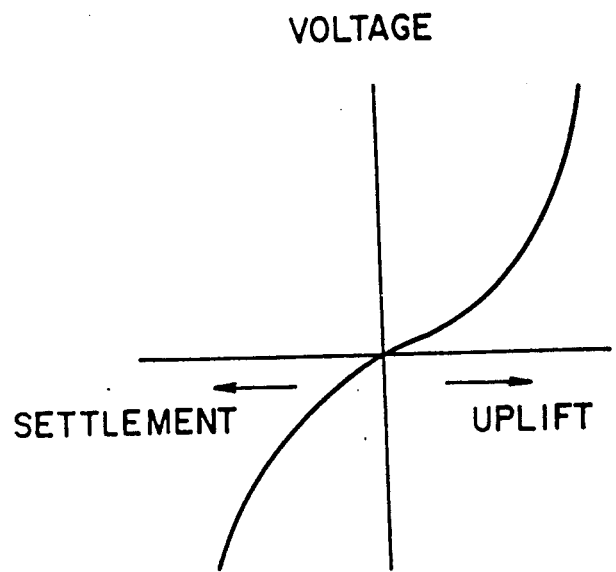
FIG. 4 is a displacement-output characteristic curve in the method of the invention.
Figure 5:
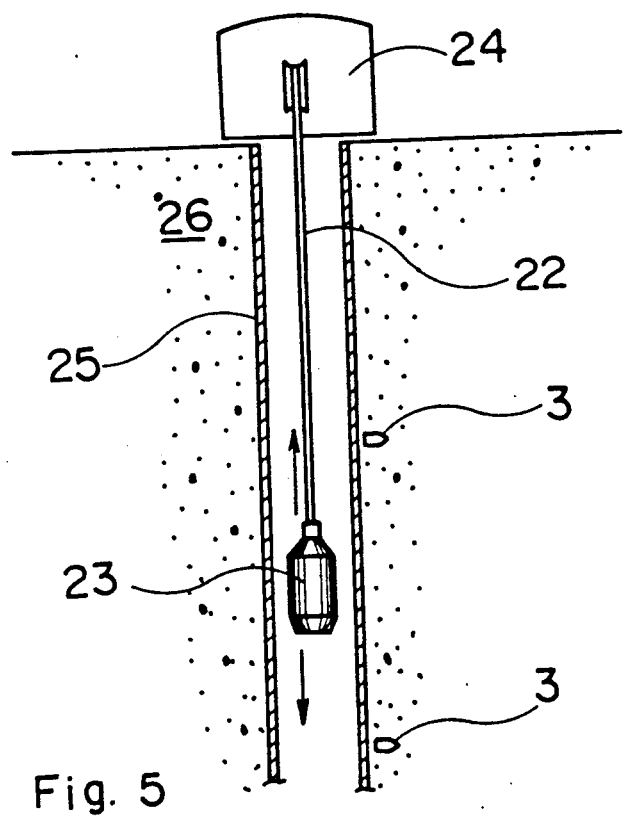
FIG. 5 is an entire view showing the ground fluctuation measuring method in the prior art.

The measuring circuit is composed as shown in FIG. 3, when the sinking element 3 is positioned in the middle (see FIG. 2) between the magnetic sensors 1 and 2, the voltage +e generated in the magnetic sensor 1 and the voltage −e generated in the magnetic sensor 2 are same voltage in reverse polarity as shown in FIG. 4, and therefore the synthetic voltage is zero volt, which is sent to an amplifier 17. At this time, the hand of the ammeter 18 connected to the amplifier 17 registers at the zero position (middle). Suppose the sinking element 3 settles downward together with the bed to be closer to the lower magnetic sensor 2, the voltage −e generated in this magnetic sensor 2 increases, and the voltage +e generated in the upper magnetic sensor 1 decreases, and this voltage difference is sent to the amplifier 17, and the hand of the ammeter 18 is moved to the minus direction by the amplified output. As the settlement of the bed is promoted, the sinking element 3 further approaches the lower magnetic sensor 2, and the swing of the ammeter 18 to the minus direction is increased.

In the case of uplift of the bed, to the contrary, the swing of the ammeter 18 is the plus direction, opposite to the settlement case, and the displacement of the bed and its direction may be known.

In this embodiment, the connector 13 of the cable 12 at each measuring point is connected to the connector 14 to perform measurement, but the labor may be saved by connecting the cables 12 as many as the measuring points, indicating by lamp on the ground monitoring position at specific amount of settlement or uplift, or issuing alarm when exceeding a limit point. In this embodiment, meanwhile, as the method of driving the sinking element, compressed air is used, but the hydraulic mechanism in the prior art may be similarly employed.

Generally, the magneto-electrical converting element used as magnetic sensor is large in temperature dependence, and accordingly the converted voltage is changed to cause a measuring error, but as shown in FIG. 3, if the magneto-electrical converting element has a large temperature drift of converted voltage, by bridge connection of the magneto-electrical converting element of the same characteristic, it may be canceled, and hence measurement at high precision is possible.

WHAT IS CLAIMED IS:

1. A measuring method of ground fluctuations comprising a step of burying a protective tube vertically into the ground, a step of burying sinking elements for generating magnetism at plural positions at different depths in the ground outside the peripheral wall of said tube, a step of detecting the magnetism generated by the sinking elements by the magnetic sensor installed in the tube, and a step of measuring the depth position in the ground of the sinking elements on the basis of the detected signal from the magnetic sensor, wherein a plurality of magnetic sensors are fixed to the inner wall surface of the tube corresponding to the individual sinking elements.

2. A measuring method of ground fluctuations according to claim 1, wherein the lower end of the protective tube is supported in a firm layer in the ground.

3. A measuring method of ground fluctuations according to claim 1, wherein the protective tube has openings at the corresponding positions of the sinking element burying positions in its peripheral wall, and the sinking elements are buried in the ground by driving the sinking elements into the ground from these openings.

4. A measuring apparatus of ground fluctuations comprising a protective tube buried vertically in the ground, sinking elements for generating magnetism as being buried in plural positions at different depths in the ground outside the peripheral wall of the tube, magnetic sensors for detecting the magnetism generated by the individual sinking elements being fixed at positions corresponding to the individual sinking elements in the inner wall surface of the tube, and measuring means for measuring the depth position in the ground of the sinking elements according to the detection signals from the magnetic sensors.

5. A measuring apparatus of ground fluctuations according to claim 4, wherein the magnetic sensors comprise elements for converting the detected magnetism into an electric signal.

6. A measuring apparatus of ground fluctuations according to claim 4, wherein the magnetic sensors are incorporated into a bridge circuit.

7. A measuring apparatus of ground fluctuations according to claim 4, wherein two magnetic sensors are used for one element in the individual sinking elements buried in the ground, and these two magnetic sensors are disposed at upper and lower positions across the depth position corresponding to individual sinking elements on the inner wall surface of the protective tube, the measuring means comprises an electric circuit for canceling the detection signals from the upper and lower magnetic sensors, and the depth position of the sinking element is measured according to the electric signal obtained from this electric circuit.

8. A measuring apparatus of ground fluctuations according to claim 4, wherein the protective tube has openings for passing sinking elements at corresponding positions of the burying positions of sinking elements in the peripheral wall, and a cylinder is provided inside the positions of these openings, and the cylinder has a driving hole toward the openings, and a spacer as piston is disposed in the driving hole, and the spacer is moved to the outside by the pressure of the compressed air vent into the rear end of the driving hole, and by the function of this spacer the sinking element inserted into the driving hole is driven into the ground from the opening.

9. A measuring apparatus of ground fluctuations according to claim 8, wherein the protective tube is composed of a first tube member disposed at the burying position of the magnetic element in the ground, and a second tube member disposed between the upper and lower first tubes and at the end part of the protective tube as required, and the first tube member has an opening for passing the sinking element in its peripheral wall, and the magnetic sensor is disposed and fixed on the inner wall surface of the vicinity of this opening, and the cylinder for driving a sinking element is disposed inside the opening.

10. A measuring apparatus of ground fluctuations according to claim 8, wherein the piping for feeding compressed air into the cylinder has an orifice for reducing the flow rate of the compressed air on its ground surface part, and two pressure gauges are disposed at front and rear sides, and the completion of driving of the sinking element is known by the pressure difference of these two pressure gauges.

* * * * *